Oct. 24, 1939.  S. B. TERRY ET AL  2,177,009
CONTINUOUSLY OPERATING THICKNESS GAUGE
Filed Dec. 24, 1937  3 Sheets-Sheet 1

INVENTOR.
Spencer B. Terry
Thomas W. Hall
BY
Joseph K. Schofield
ATTORNEY

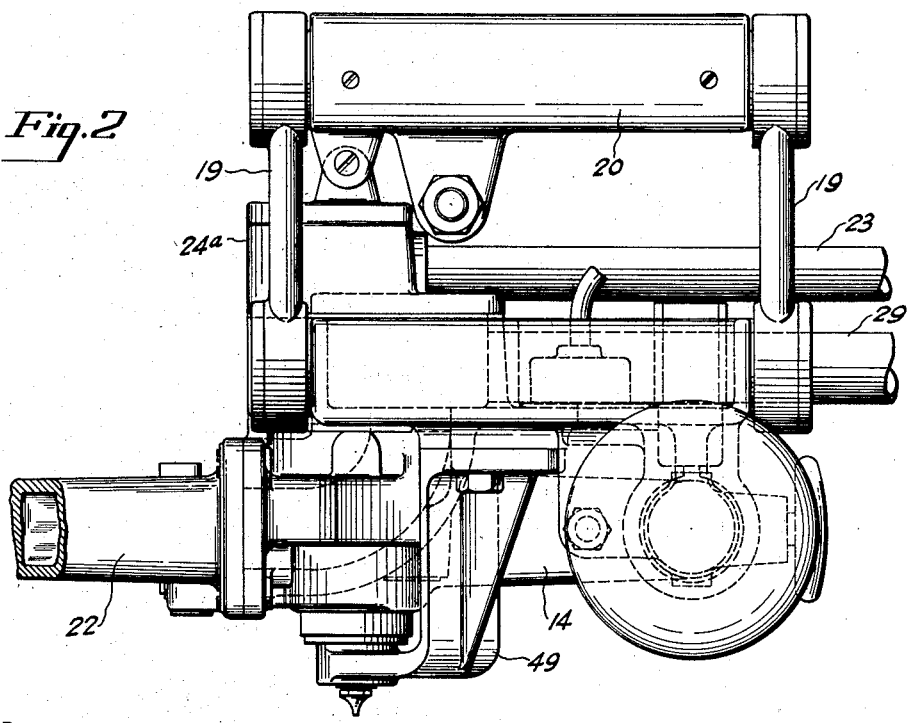
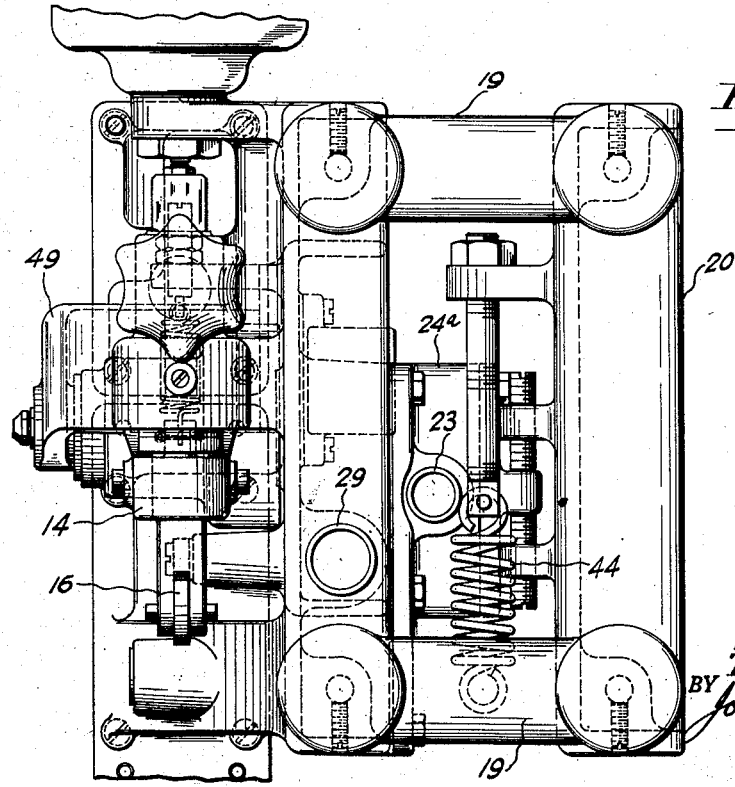

Oct. 24, 1939.  S. B. TERRY ET AL  2,177,009
CONTINUOUSLY OPERATING THICKNESS GAUGE
Filed Dec. 24, 1937  3 Sheets-Sheet 3
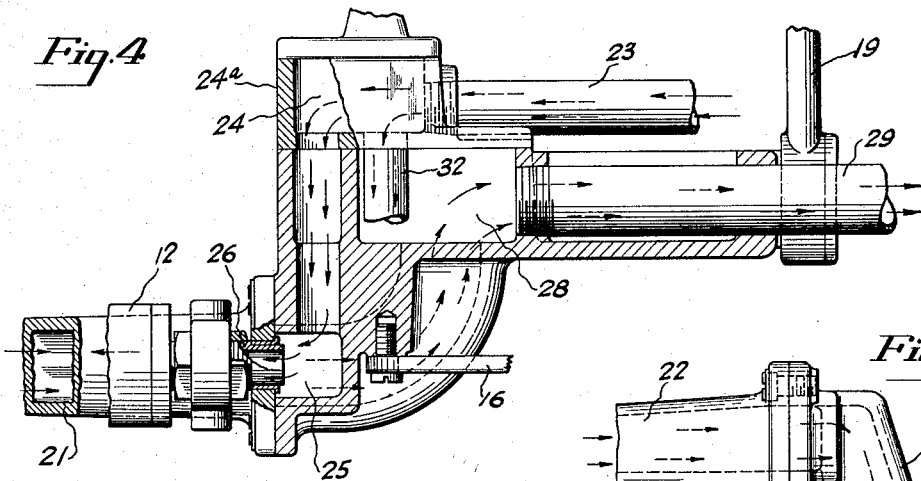
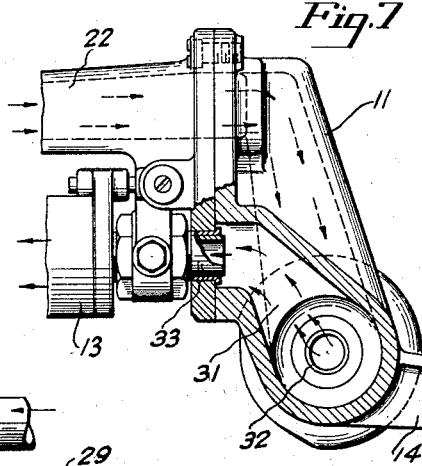
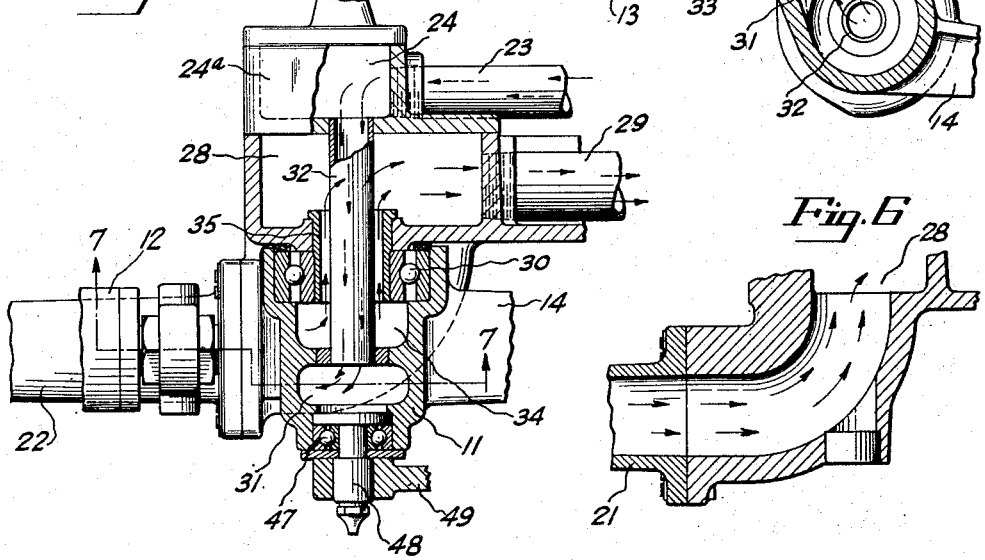
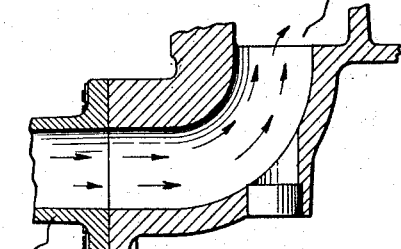
INVENTOR.
Spencer B. Terry
Thomas W. Hall
BY
ATTORNEY Patented Oct. 24, 1939

2,177,009

UNITED STATES PATENT OFFICE 2,177,009

CONTINUOUSLY OPERATING THICKNESS GAUGE

Spencer B. Terry, West Hartford, and Thomas W. Hall, Torrington, Conn., assignors to Niles-Bement-Pond Company, Hartford, Conn., a corporation of New Jersey Application December 24, 1937, Serial No. 181,556

13 Claims. (Cl. 33—148)

This invention relates to continuously operating gauges to determine the thickness of strip or sheet material, and relates particularly to a gauge of this type engaging the upper and lower surfaces of the strip or sheet of material as it is being rolled or otherwise formed and while the material is at a high temperature and moving rapidly past the gauge.

In gauging rolled material such as elongated strips or sheets, the temperature of the material gauged is frequently so high that effective means should be taken to prevent this heat being absorbed by portions of the gauge sufficiently to expand them and thus give a false reading. It would not be practical to flood the material being gauged as it passes from the rolls with a cooling liquid for the reason that the gauge may be placed at an intermediate point in the rolling operations which would necessitate reheating the material before successive rolling operations could be performed. It is therefore a primary object of the invention to accurately gauge strip or sheet material at a relatively high temperature by providing means to prevent the heat of the material being gauged reaching the gauging members and consequently distorting different parts of the gauge sufficiently to adversely affect the gauge readings.

An object of the invention is to provide heat dissipating means particularly for the work contacting members of the gauge so that in gauging material at high temperatures the accuracy of the device will not be affected by expansion of the parts forming the gauge.

One feature which enables us to accomplish the above named object is that the work contacting members are in the form of hollow rotatable members forming rollers freely rotatable while contacting with the work being gauged.

Another object of the invention is to supply cooling liquid through conduits formed within the supporting member for the work contacting members and admitting fluid directly to the interior of the work engaging rollers, there being individual conduits within the body member through which the cooling liquid is continuously supplied to each roller and other conduits extending from the opposite ends of each of the rollers through which the cooling liquid is withdrawn, these conduits being connected through flexible connections respectively to a supply of fluid and to a drain or return tank.

Another feature which is advantageous is that the conduits are formed within the supporting members for the work contacting rollers to admit the fluid to the interior of the rollers, thus forming a simple cooling means for the contacting members without requiring additional members for that purpose.

And finally it is an object of the invention to provide the fluid conduits for the movable gauging member through the pivotal or other mounting therefor so that fluid may be supplied continuously to the movable gauging or work engaging roller in all positions of its adjustment.

With the above and other objects in view, the invention includes the features of construction and operation set forth in the following specification and illustrated in the accompanying drawings.

In the accompanying drawings annexed hereto and forming a part of this specification, we have shown our invention embodied in a precision gauge generally similar to that shown and described in copending application Serial No. 157,174, filed August 3, 1937, the electric circuits and induction coils for determining the position of the movable roller being similar to those shown in the patent to Mershon et al. 1,928,457, granted September 26, 1933, but it will be understood that the invention can be otherwise embodied and that the drawings are not to be construed as defining or limiting the scope of the invention, the claims appended to this specification being relied upon for that purpose.

In the drawings:

Fig. 2 is a plan view of some of the parts shown in Fig. 1.

Fig. 3 is an end elevation of the complete gauge looking from the right side of Fig. 1.

Fig. 4 is a horizontal sectional view showing the fluid conduits to and from the fixed roller and taken on the planes of broken line 4—4 of Fig. 1.

Fig. 5 is a horizontal sectional view taken on the plane of line 5—5 in Fig. 1 and showing the fluid conduits through the pivotally mounted member.

Fig. 6 is a horizontal sectional view on the plane of line 6—6 of Fig. 1 and showing a portion of the fluid exhaust conduits in the body member; and Fig. 7 is a vertical sectional view on line 7—7 of Fig. 5 showing the fluid admitting and exhausting conduits to the upper or movable roller.

Figure 1:
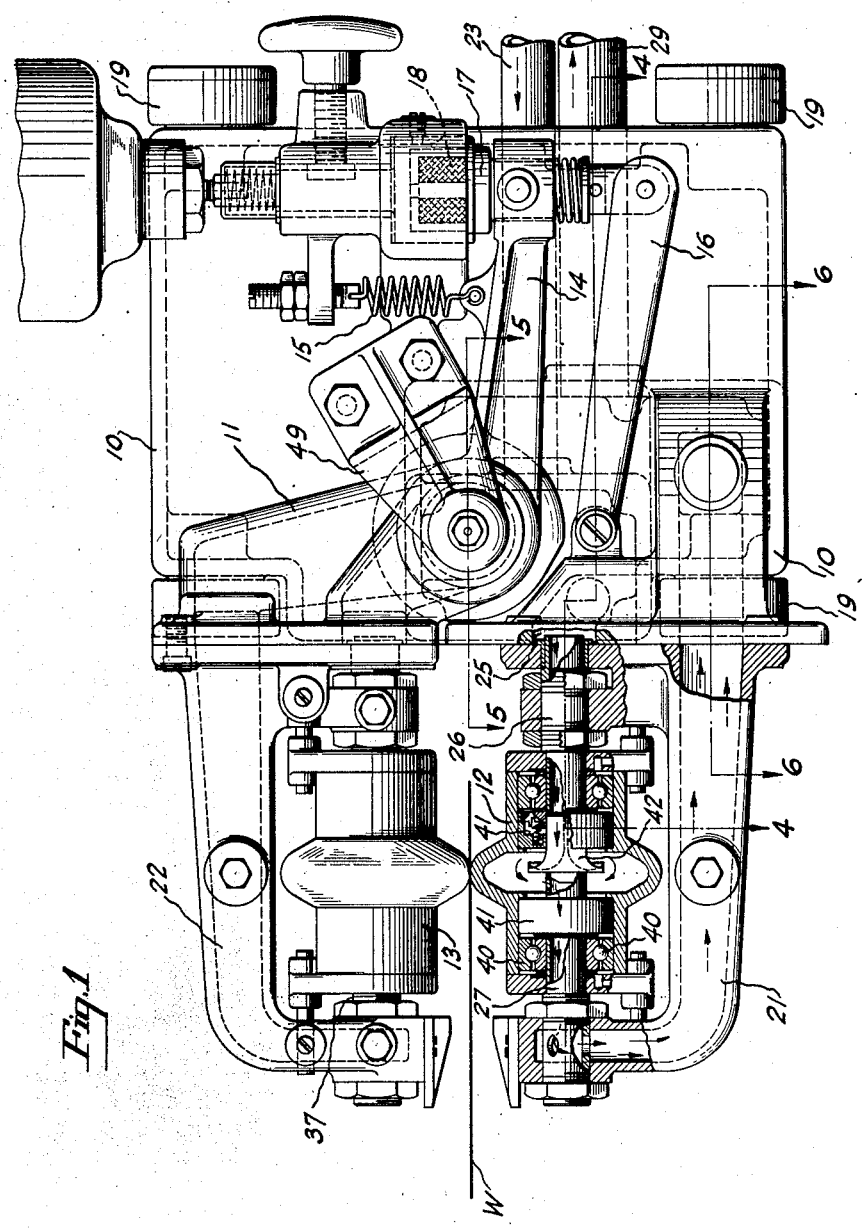
Figure 1 is a front elevation of a complete gauge made in accordance with the present invention, parts being shown in section to more clearly illustrate their construction.

In the above-mentioned drawings there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a gauge body member mounted for limited free vertical movement upon a system of parallel links in the same manner substantially as in the copending application referred to above; second, a rotatably mounted work engaging member or roller on this body portion; third, an opposed work engaging member rotatably mounted within a member supported pivotally upon the body member so that its roller is movable toward and from the first mentioned roller; fourth, precision means for indicating the distance between the rollers in different oscillated positions of the pivotally supported roller; fifth, supports for the rollers in the form of tubular or hollow members extending to opposite ends of the rollers; and sixth, short supporting shafts extending between the terminals of these tubes upon which the rollers are free to rotate upon their longitudinal axes, preferably upon anti-friction bearings, there being continuous passages from one tube to the other within each roller extending through the supporting shafts therefor and permitting liquid passing through the hollow members to circulate through the space within the rotating rollers.

Referring more in detail to the figures of the drawings, I provide a gauge body portion 10 having pivotally mounted thereon a member 11, the body portion 10 and the pivotal member 11 having rotatable work contacting members or rollers 12 and 13 supported therein respectively in opposed relation one above the other. Electromagnetic means are provided, generally similar to those shown and described in the above-referred to patent, for determining the distance apart of the work contacting rollers 12 and 13 so that a complete description thereof will be unnecessary.

The oscillatory member 11 has a rearward extending arm 14 normally pressed upward by a coiled spring 15 to force the roller 13 toward roller 12. Extending parallelly with the arm 14 is an arm 16 pivotally supported at one end to the body member 10 and at the outer rearward end to a vertical rod 17. At an intermediate point the rod 17 is pivotally connected to the rear end of the arm 14. The upper end of this rod 17 forms an armature 18 movable by oscillations of the member 11 toward and from an induction coil 18 adjustably secured directly to the body member 10. By means of the arms 14 and 16 the rod or bar 17 is maintained at all times vertical and normal to the plane of the material being gauged. The means for adjusting the position of the coil 18 for different thicknesses of material being gauged and for reading the gauged dimension will not require description for the reason that these parts of the construction may correspond to those described in the above-referred to patent or application.

It will be seen from an inspection of the drawings that the body portion 10 is suitably supported upon a system of parallel links 19 so that it may rise and fall during its gauging operation while maintaining a correct gauging position relative to the material W being gauged. The links 19 flexibly connect the body member 10 to a fixed supporting member 20 mounted in any desired manner so that the body member 10 may adjust itself to the plane of the material W being gauged.

Extending from the front face of the body member 10 and pivotal member 11 are hollow or tubular members 21 and 22, these members being generally similar to each other and forming the fluid exhausting conduits from the rollers 12 and 13 respectively. These tubular members also serve to rotatably support the outer ends of the rollers 12 and 13.

First referring to the mounting and fluid supplying means for the fixed or lower roller 12 most clearly shown in Figs. 1 and 4, it will be seen that a pipe 23 suitably connected, preferably by flexible connections (not shown), to a source of fluid extends horizontally and has its forward end threaded or otherwise secured so that it will enter a recess 24 in member 24ª secured to the body member 10. The front face of the body member 10 has an opening 25 from this recess 24 by a transverse passage to a tube 26 entering the space within roller 12 at its opposite end. From the opposite or outer end of roller 12 extends a tube 27 entering the end of arm 21. Openings within this tube 27 permit fluid after entering the roller 12 to be returned through arm 21 to a recess or cavity 28 in the body member 10 from which the fluid may enter a pipe 29 extending preferably through flexible connection to a tank or reservoir (not shown).

To admit fluid to the upper roller 13 as shown in Figs. 5 and 7, fluid connections are provided from the recess 24 through one of the pivotal bearings 30 for the arm 11. Between the recess 24 in the body member 10 and a recess 31 in the pivotal member 11 is a tube 32 so that fluid from the pipe 23 and recess 24 may enter the pivotal member 11. From this recess 31 the fluid enters a small supporting tube 33 for one end of the roller 13. The opposite end of the roller 13 by a tube 37 similar to tube 26 for roller 12 permits fluid to enter the return passage extending through arm 22. From the arm 22 the fluid passes to a recess 34 in arm 11 and from this recess through sleeve 35 surrounding tube 32 to the exhaust or return cavity 28.

The rollers 12 and 13 therefore are supported for rotation upon fixed axes concentric with the short tubes 26 and 33 which are disposed in alignment respectively with corresponding tubes 27 and 37 entering their opposite or outer ends. To facilitate rotation of these rollers 12 and 13 there may be provided anti-friction bearings 40 mounted upon the tubes 26, 27, 33 and 37 and having their outer races disposed within and engaging the rollers 12 and 13. Adjacent and inside the anti-friction bearings 40 for the rollers 12 and 13 are fluid sealing devices 41 so that fluid circulating through the rollers 12 and 13 may not come in contact with the anti-friction bearings 40. Preferably and as shown, the tubes 26 and 33 entering the rollers 12 and 13 have a supplemental member forming a central deflector 42 so that fluid extending from the tubes 26 or 32 substantially centrally of a roller will be caused to be thrown radially outward into contact with the work engaging portions of the roller before passing into the return tube.

In operation the sheet of metal W being gauged passing between rollers 12 and 13 causes tilting of the pivotal member 11 relative to the body member 10. The body member by its mounting on links 19 and by the pressure of a light coil spring 14 is maintained with the fixed roller 12 in contact with the lower side of the material W. Oscillations of the pivotal member 11 due to variations in thickness of the sheet or strip being gauged vary the position of armature 17 relative to the electro-magnetic coil 18 supported on the body member 10. By means of an indicating instrument and a source of alternating current forming no part of the present invention, variations in the separation of the rollers 12 and 13 are indicated. It is therefore possible to continuously cool the gauging rollers 12 and 13 by the constant circulation of cooling fluid such as water through the interior of the hollow rotatable work engaging portions, thus preventing incorrect readings due to variations in temperature and consequent expansion of the principal members forming the gauge. There is at all times a relatively large amount of cooling fluid retained within the recesses of the body member 10 and pivotal member 11 as well as a constant flow of fluid through the gauging members 12 and 13 so that appreciable heating of these rollers due to contact with hot material will be avoided.

By reference to Figs. 4 and 5 it will be seen that there are two separately connected recesses 25 and 31 for supplying the fluid to the rollers 12 and 13 through the body member from recess 24, the central tube 32 permitting fluid to flow under pressure from recess 24 to recess 31. The connecting tube 32 is mounted coaxially with the axis of oscillation of the pivotal member 11 so that the fluid supplied to the rollers 12 and 13 may have continuous passage from the body member 10 at all times. One passage leads directly from recess 24 to recess 25 and thence to the lower roller 12. The other passage 31 leads to the roller 13 supported within the pivotal member 11 and receives its fluid from recess 24 through tube 32. Similarly exhaust or return passages 28 and 34 are provided through the body member 10 and the pivotal member 11 connected by a sleeve 35 within the body member from which the fluid may be exhausted. Also as shown in Fig. 5 this sleeve 35 may form the mounting for the pivotal bearing 30.

The pivotal member 11 also may be additionally supported for its oscillatory movement by a supplementary anti-friction bearing 47 provided for that purpose in addition to bearing 30 surrounding the sleeve 35. This supplementary or outer anti-friction bearing 47 is mounted within the pivotal member 11 beyond the recess 31 and is supported by means of a stud or extension 48 provided in a short bracket 49 secured in fixed position to the side surface of the body member.

We claim as our invention:

1. A gauge for determining the thickness of material while in motion comprising in combination, a body portion, a rotatable work contacting member mounted thereon, an opposed rotatable work contacting member movable toward and from said first contacting member during gauging operations, means to indicate variations from predetermined adjusted distances between said contacting members, and means to supply a liquid to within said contacting members.

2. A gauge for determining the thickness of material while in motion comprising in combination, a body portion, a work contacting member mounted thereon, an opposed work contacting member movable toward and from said first contacting member, means to indicate variations from predetermined adjusted distances between said contacting members during gaging operations, and conduits leading to said contacting members, whereby a liquid may be admitted to and exhausted from within said contacting members.

3. A gauge for determining the thickness of material while in motion comprising in combination, a body portion, a work contacting member mounted thereon, an opposed work contacting member movable toward and from said first contacting member, means to indicate variations from predetermined adjusted distances between said contacting members during gauging operations, and hollow supporting members for said contacting members, whereby a liquid may be admitted to and exhausted from within said contacting members through said hollow supporting members.

4. A gauge for determining the thickness of material while in motion comprising in combination, a body portion, a work contacting member mounted thereon, an opposed work contacting member movable toward and from said first contacting member, means to determine the distance between said contacting members during gauging operations, members rotatably supporting said contacting members, and conduits extending through said supporting members to opposite sides of said contacting members, whereby a liquid may be admitted to and exhausted from within said contacting members.

5. A gauge for determining the thickness of material while in motion comprising in combination, a body portion, a rotatable work contacting member mounted thereon, an opposed rotatable work contacting member movable toward and from said first contacting member, means to indicate variations from predetermined adjusted distances between said contacting members during gauging operations, central supporting shafts for said contacting members and having openings therein, and conduits extending to opposite sides of said contacting members and through said shafts, whereby a liquid may be admitted to and exhausted from within said contacting members through said shafts.

6. A gauge for determining the thickness of material while in motion comprising in combination, a body portion, a rotatably mounted hollow work contacting member therein, an opposed rotatable hollow work contacting member movable toward and away from said first contacting member, means to indicate variations from predetermined adjusted distances between said contacting members during gauging operation, and means to supply liquid continuously to the space within said rotatable members.

7. A gauge for determining the thickness of material while in motion comprising in combination, a body portion, a rotatably mounted hollow work contacting member therein, an opposed rotatable hollow work contacting member movable toward and away from said first contacting member, means to indicate variations from predetermined adjusted distances between said contacting members, supporting members for said contacting members, and means within said supporting members to supply liquid continuously to the space within said rotatable members.

8. A gauge for determining the thickness of material while in motion comprising in combination, a body portion, a rotatably mounted work contacting member therein, a member pivotally mounted on said body member having an opposed rotatable work contacting member therein movable toward and away from said first contacting member, means to determine the distance between said contacting members, hollow supporting members for said contacting members, and conduits extending through said body member and said pivotal member to said hollow supporting members, whereby liquid may be admitted to within said contacting members respectively through said supporting members.

9. A gauge for determining the thickness of material while in motion comprising in combination, a body portion, a rotatably mounted work contacting member therein, a member pivotally mounted on said body member having an opposed rotatable work contacting member therein movable toward and away from said first contacting member, means to determine the distance between said contacting members, hollow supporting members for said contacting members, and conduits extending through said body member and said pivotal member to said hollow supporting members, whereby liquid may be admitted to within said contacting members respectively through said supporting members, the conduits for the fluid admitted to said second mentioned roller extending through the pivot mounting of said pivotal member.

10. A mounting for work contacting members of a thickness gauge comprising opposed hollow shafts, disposed in alinement with each other, a hollow roller surrounding said shafts, said shafts having openings therein within said roller, bearings supporting said roller on said shafts, fluid sealing means between said roller and said shafts, means to admit fluid to one of said shafts, and means to exhaust fluid from the other of said shafts.

11. A mounting for work contacting members of a thickness gauge comprising opposed hollow shafts, disposed in alinement with each other, a hollow roller surrounding said shafts, said shafts having openings therein within said roller, anti-friction bearings supporting said roller on said shafts, fluid sealing means between said roller and said shafts disposed between said bearings, means to admit fluid to one of said shafts, and means to exhaust fluid from the other of said shafts.

12. A mounting for work contacting members of a thickness gauge comprising opposed hollow shafts, disposed in alinement with each other, a hollow roller surrounding said shafts, said shafts having openings therein within said roller, anti-friction bearings supporting said roller on said shafts, fluid sealing means between said roller and said shafts, means to admit fluid to within one of said shafts and to the interior of said roller, and means to exhaust fluid from the roller through the other of said shafts.

13. A mounting for work contacting members of a thickness gauge comprising opposed hollow shafts, disposed in alinement with each other, a hollow roller surrounding said shafts, said shafts having openings therein within said roller, anti-friction bearings supporting said roller on said shafts, fluid sealing means between said roller and said shafts, means to admit fluid to within said roller through one of said shafts, a fluid deflecting member on said shaft within said roller, and means to exhaust fluid from said roller through the other of said shafts.

THOMAS W. HALL.
SPENCER B. TERRY.